(12) United States Patent
Pieper

(10) Patent No.: US 6,238,604 B1
(45) Date of Patent: May 29, 2001

(54) METHOD FOR PRODUCING A COMPOSITE BATHTUB

(75) Inventor: Fritz Pieper, Delmenhorst (DE)

(73) Assignee: Franz Kaldewei GmbH & Co., Ahlen (DE)

(*) Notice: Subject to any disclaimer, the term of this patent is extended or adjusted under 35 U.S.C. 154(b) by 0 days.

(21) Appl. No.: 09/341,909

(22) PCT Filed: Nov. 20, 1998

(86) PCT No.: PCT/EP98/07450

§ 371 Date: Jul. 20, 1999

§ 102(e) Date: Jul. 20, 1999

(87) PCT Pub. No.: WO99/26776

PCT Pub. Date: Jun. 3, 1999

(30) Foreign Application Priority Data

Nov. 21, 1997 (DE) .............................. 197 51 759

(51) Int. Cl.$^7$ .............................. B29C 44/06; B29C 44/12
(52) U.S. Cl. ............... 264/46.4; 264/46.5; 264/46.8; 264/154; 264/259; 264/291
(58) Field of Search ................. 264/259, 46.5, 264/154, 291, 46.4, 46.8; 4/584; 428/34.7

(56) References Cited

U.S. PATENT DOCUMENTS

| 4,289,717 | * | 9/1981 | Bortz | 264/46.5 |
|---|---|---|---|---|
| 4,731,213 | * | 3/1988 | Klepsch | 264/512 |
| 4,822,652 | * | 4/1989 | Sempio et al. | 4/584 |
| 4,938,825 | * | 7/1990 | MacDonald | 4/584 |
| 5,300,531 | * | 4/1994 | Weaver | 521/51 |
| 5,534,216 | * | 7/1996 | Kamiyama | 264/511 |

FOREIGN PATENT DOCUMENTS

| 43 38 963 | 5/1995 | (DE) . |
|---|---|---|
| 195 44 426 | 4/1997 | (DE) . |
| 904763 | 8/1962 | (GB) . |

* cited by examiner

*Primary Examiner*—Allan R. Kuhns
(74) *Attorney, Agent, or Firm*—Pauley Petersen Kinne & Fejer

(57) ABSTRACT

A method for producing a composite bathtub having at least one steel shell and at least one acrylic shell which are solidly joined to each other. A deep-drawn acrylic blank is first reverse-drawn over a core. An outer shell mold is then placed over the acrylic blank, at a certain distance from the acrylic blank. Once the outer shell mold and the acrylic blank are sealed off from each other, a reaction resin is injected into the space between the two shells. After the reaction resin has set, the outer shell mold is removed and the steel blank is positioned. The space between the steel blank and the acrylic blank is re-sealed and a polymer foam is injected into this intermediate space. Once the polymer foam has cross-linked, the composite bathtub is complete. One advantage of the method of this invention is that the acrylic shell and the steel exterior of the composite bathtub do not have to be identical in shape.

16 Claims, 4 Drawing Sheets

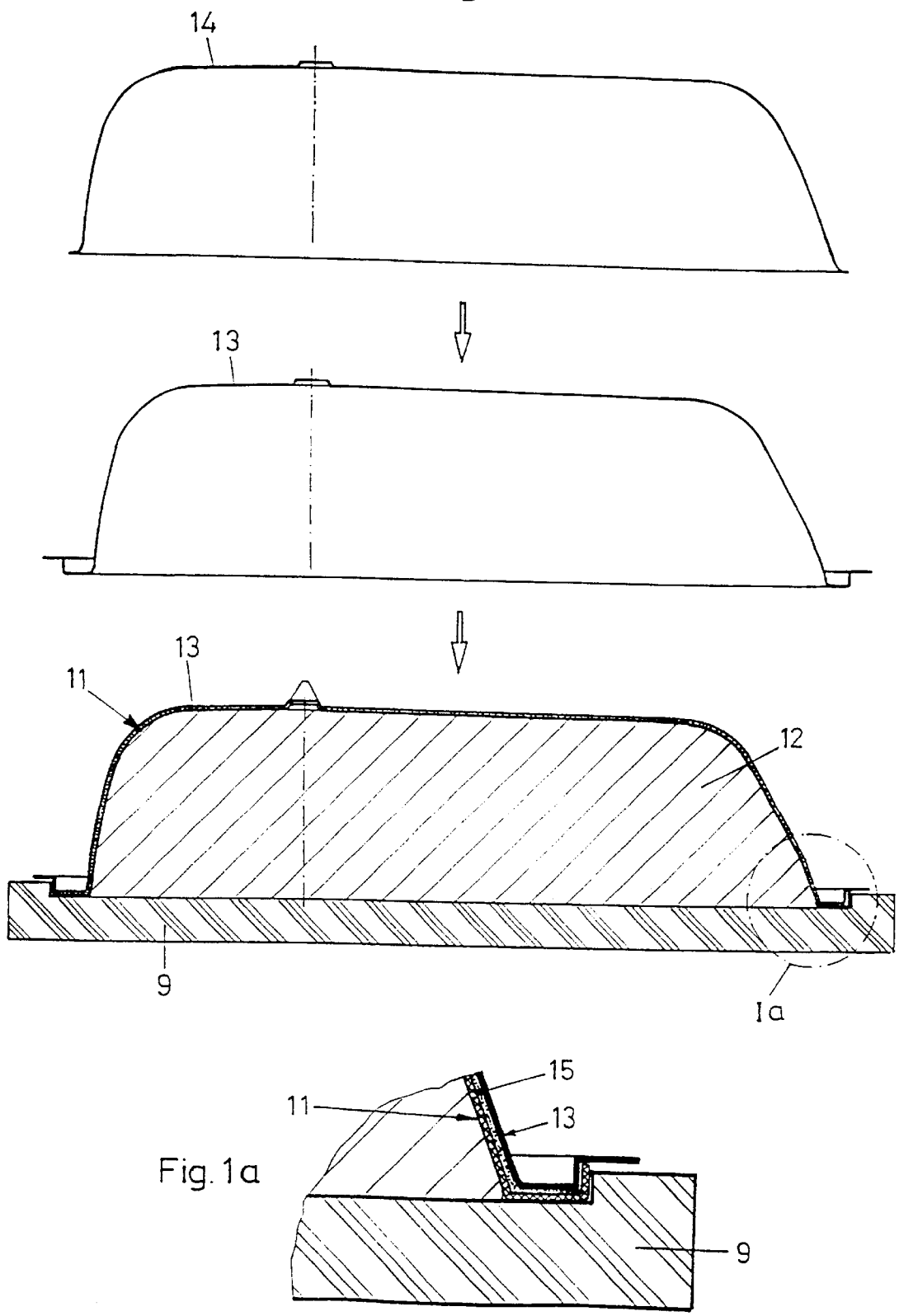

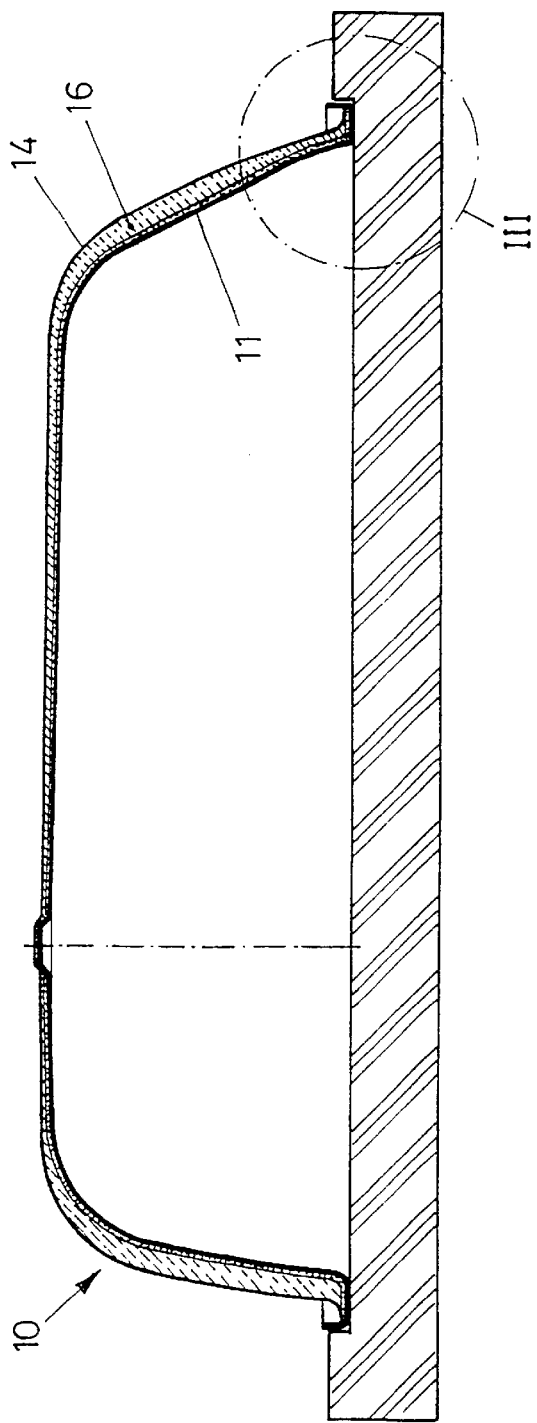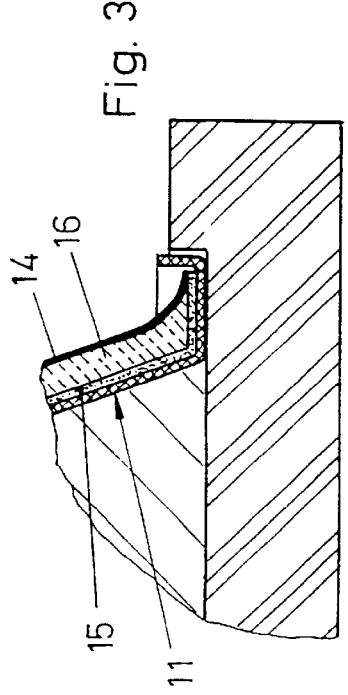

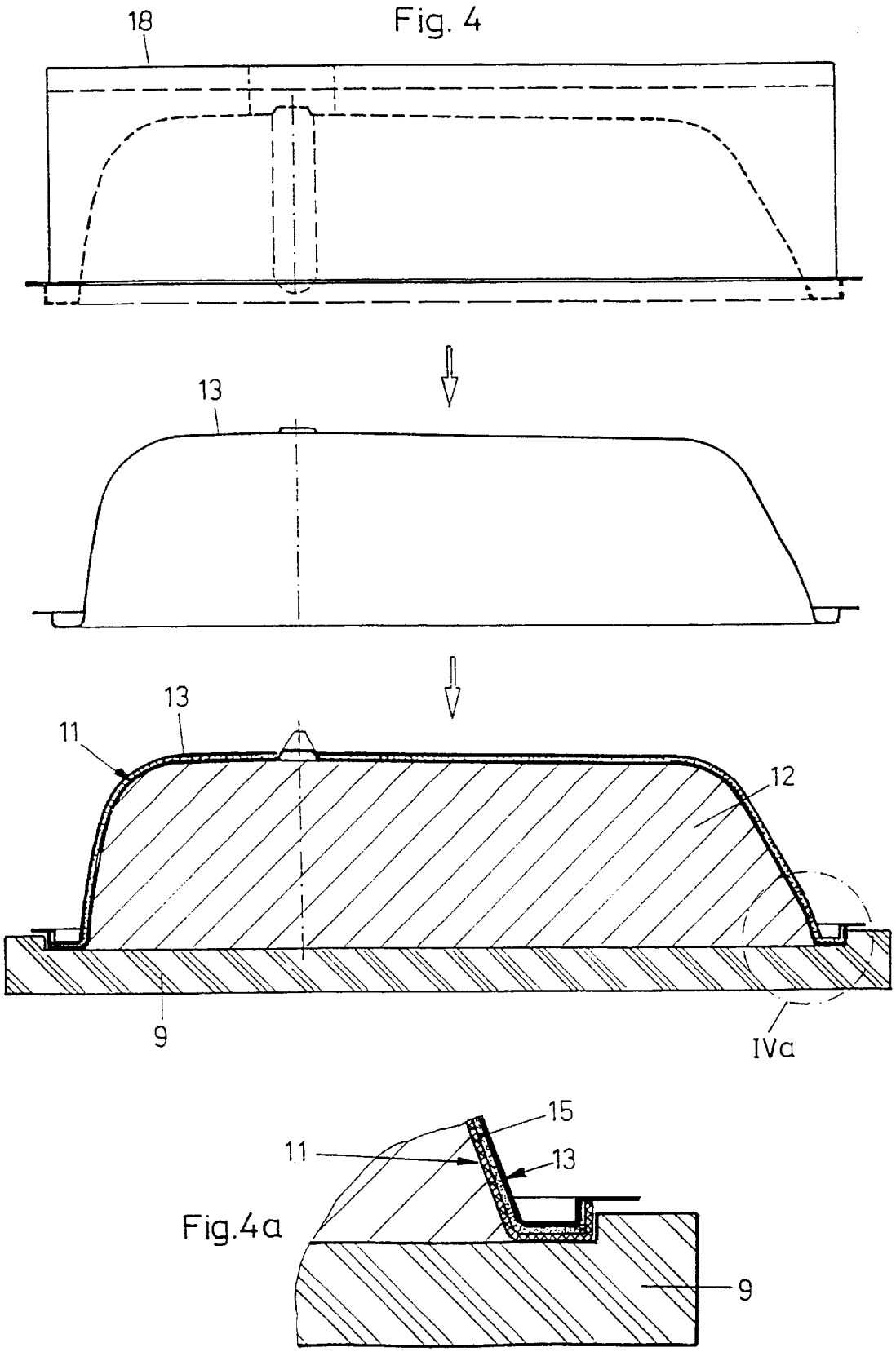

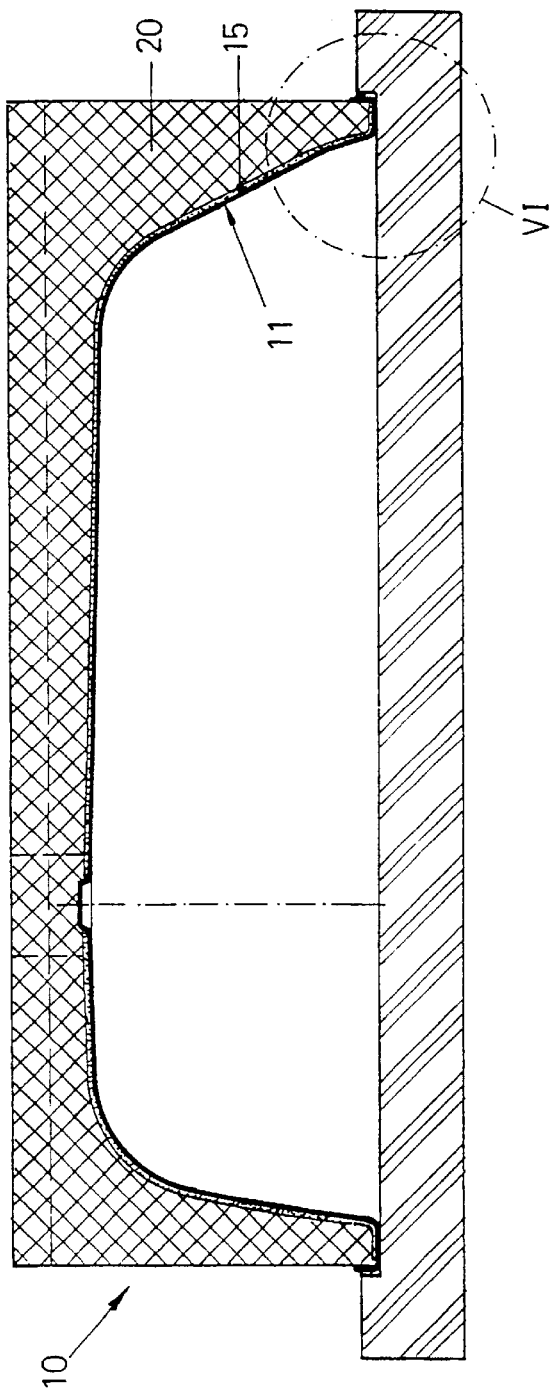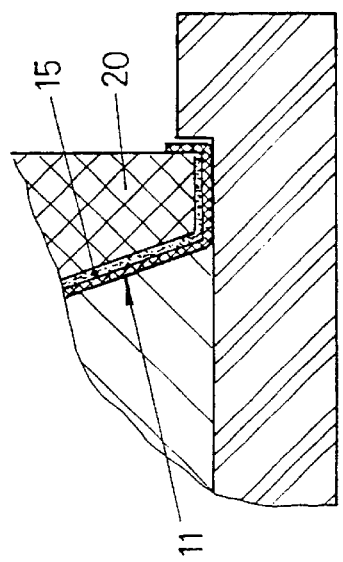

METHOD FOR PRODUCING A COMPOSITE BATHTUB

The present invention relates to a method for producing a composite tub consisting of at least one steel tub and at least one acrylic tub, which are firmly connected with each other, wherein in a first step a deep-drawn acrylic blank is inverted over a core.

A method for producing composite tubs of the above mentioned type is known from DE 195 44 426 C1, for example. In this known method an inner shell made of acrylic (acrylic blank) is connected with an outer shell made of steel, wherein a two-component plastic material is injected into the space between the two shells as a filler, so that after the latter has cured, a three-layered tub is created, having an outer layer of steel, which stabilizes the tub, an inner layer of acrylic, which represents the usable layer of the finished tub, and an intermediate layer created from the two-component liquid plastic material, which provides a satisfactory bond between the two other layers.

A disadvantage of this known method lies in that the outer steel skin must respectively be of identical shape with the acrylic shell to a large degree. Because of this, there is either a fixed limited number of composite tubs of different designs, or a large number of variously shaped steel blanks must be stored. This is naturally connected with increased expenses for the manufacturer, since the individual steel blanks also must be initially produced, which generally are made of sheet steel also in a deep-drawing process.

It is therefore the object of the present invention to create a method for producing composite tubs of the type mentioned at the outset which also permits changes in the shapes of the outer steel blank and the inner acrylic shell.

This object is attained by means of a method in accordance with the invention for producing composite tubs of the species mentioned at the outset, having the characterizing features of the main claim. The method in accordance with the invention is such that initially the deep-drawn acrylic blank is again inverted over the core. But thereafter, an outer mold shell is placed at a defined distance over this acrylic blank. The outer mold shell and the acrylic blank are sealed against each other, and a suitable reaction resin is injected into the space between the outer mold shell and the acrylic blank. After the reaction resin has cured, the outer mold shell can be removed. An intermediate product is obtained in this way which, on the one side, has the interior shape of the acrylic blank, which was the starting point, and on the other side has an outer layer as a coating made from the reaction resin, which stabilizes the acrylic layer. Thereafter it is possible to apply a steel blank of a shape which differs from that of the initial acrylic blank. The steel blank and the acrylic blank (intermediate product) are again sealed against each other. A space is left free between the steel blank and the intermediate product (acrylic blank with a coating), into which a polymer foam is injected. A composite tub, which can be unmolded, results after the polymer foam has been cross-linked. This composite tub is a product whose acrylic component which, when the tub is used, constitutes the inner skin and can have a shape different from that of the steel tub which, when the tub is used, constitutes the outer skin and is used as a stabilizing support.

Regarding the difference of the respective shapes, the distance between the acrylic blank and the steel blank is of course important. This distance, which is determined by the respective production techniques, can vary and can be up to approximately 50 mm or more, for example. As a rule, in molding the acrylic shell which determines the desired design of the end product, the designer can use the distance between the two shells to a large percentage, for example up to approximately 80%. Thus, an essential advantage of the method in accordance with the invention lies in that the same steel blank can be used for several acrylic blanks of designs which vary within defined limits.

Preferred further developments of the above mentioned method in accordance with the invention are hereafter described.

A plastic on the basis of methyl methacrylate or polyurethane or an epoxy or polyester is preferably used as the said reaction resin. A polyurethane foam system is preferably employed for the polymer foam.

It is possible to utilize a drain or overflow bore of the tub, or respectively the tub blanks, for injecting the polymer foam, or respectively the reaction resin, into the respective space. The drain and/or overflow bores are preferably cut into the finished tub following unmolding.

In accordance with a variation, the invention furthermore relates to the production of a composite tub comprising at least one support and at least one acrylic shell, which are firmly connected with each other, wherein in a first step a deep-drawn acrylic blank is inverted over a core, while the following steps are initially performed in the same way as in the method mentioned at the outset. Thus, subsequently an outer mold shell is placed at a distance over the acrylic blank. Then the outer mold shell and the acrylic blank are sealed against each other and a suitable reaction resin is injected into the space between the outer mold shell and the acrylic blank. After the reaction resin has cured, the outer mold blank is removed and then an acrylic blank is obtained, which is provided with a coating on the outside (underside).

However, in a change from the method mentioned at the outset, after removing the first outer mold shell a new outer mold shell of the exterior measurements of a tub support, which is a part of the tub, is placed instead of the steel blank. This method has the advantage that it makes it possible to produce a tub (preferably a bathtub or shower tub) which immediately following the production has an integrated tub support below the actual tub body, which is connected with the latter.

Preferably, a seal toward the newly placed outer mold shell is first provided after placement. Moreover, a polymer foam is preferably injected into the space between this tub and the new outer mold shell and, after it has been cross-linked, a finished tub with an integrated tub support is removed.

Again, the drain or/respectively overflow bores are preferably made in the finished tub.

It has been shown that within the scope of the present invention a foam is used as a polymer foam, which has a foam density within a range between approximately 40 kg and 60 kg, preferably in the range of approximately 50 kg. A polyurethane foam is also preferably used here as the polymer foam.

A method for producing such a composite tub with an integrated tub support is described. Furthermore, a composite tub with or without an integrated tub support is also a subject of the present invention, which was produced in accordance with the method of one of claims 1 to 12. Further advantages of the present invention ensue from the following detailed description.

BRIEF DESCRIPTION OF THE DRAWINGS

The present invention will be described in greater detail in what follows by means of exemplary embodiments, making reference to the attached drawings. Shown here are in:

FIGS. 1 and 1a illustrate an exploded view, by means of which one variation of the method in accordance with the invention will be explained;

FIG. 2, a sectional view of a finished tub, which was produced by the method in accordance with a variation of the invention;

FIG. 3, an enlarged detailed view of a section III of FIG. 2;

FIGS. 4 and 4a present an exploded view, by means of which a method of the invention in accordance with a further variation is explained;

FIG. 5, a sectional view of a finished tub, which was produced by a method in accordance with a further variation of the invention;

FIG. 6, an enlarged detailed view of a section VI of FIG. 5.

DETAILED DESCRIPTION OF THE INVENTION

First, reference is made to FIGS. 1 to 3. FIG. 1 shows a schematically simplified exploded view, by means of which a variation of the method in accordance with the invention will be explained. An acrylic blank 11, for example for a bathtub, which has been inverted over a core 12, is represented in FIG. 1. Here, the acrylic blank 11 rests on the core 12 in such a way that the underside of the future tub lies on top. The acrylic blank 11 and the core 12 rest on a base plate 9. The outer mold shell 13 is now represented in the center of the drawing and is inverted over the acrylic blank 11 on the core 12, actually at a relatively short distance, for example of a few millimeters, so that a space results. Thereafter this outer mold shell 13 and the acrylic blank 11 are sealed off from another, and a reaction resin, for example polyurethane, is injected into the space between the outer mold shell 13 and the acrylic blank 11. After this reaction resin has cured, the outer mold shell 13 is lifted off again, and an acrylic blank with a layer in the form of a coating of reaction resin on the underside has been created, wherein the coating has a layer thickness corresponding to the distance between the outer mold shell 13 and the acrylic blank 11. This intermediate stage of the acrylic blank 11 with the coating created from the reaction resin 15 is represented in FIG. 1a.

Reference is again made to FIG. 1. After the outer mold shell 13 has been removed, the outer steel shell (steel blank 14) is placed and inverted over the acrylic blank 11, which has been provided with the coating made of the reaction resin 15. This steel blank 14, represented on the top in FIG. 1, is special in that it has a simplified, quasi standardized shape and therefore can be used for various acrylic blanks 11 with designs differing from each other. Hereafter, this steel blank 14 is sealed against the acrylic blank 11. In this case the space between the acrylic blank 11 and the steel blank 14 has of course different widths in different areas, since the acrylic blank 11 does have a design which differs from the steel blank, so that therefore no parallelism of the two blanks exists. A polymer foam 16 is now injected into this space, which provides a bond between the acrylic blank 11 provided with the reaction resin 15 and the steel blank 14. It can be clearly seen from FIG. 2 that this space, which is completely filled with the polymer foam 16, has a different width (thickness) in various areas of the tub. The different layers from which the composite tub 10 of the invention is constructed, can be again better seen from the enlarged representation in FIG. 3. The lowest layer is the acrylic layer, which corresponds to the acrylic blank 11 and which in the finished tub forms the inner layer, or respectively usable layer, of the composite tub 10 when the finished tub is used. This is followed toward the outside, or respectively in the drawing toward the top, by a relatively thin layer with the coating of reaction resin. The thickness of the acrylic blank can be different in different areas, for example caused by the deep-drawing process during its manufacture. The thickness of the acrylic blank can be between 1 mm and approximately 4 mm, for example. The thickness of the coating of the reaction resin on it can for example be approximately 2 mm to 3 mm.

In FIG. 3 the steel blank 14, constituting the outer shell, can be seen, as well as the space between the steel blank 14 and the acrylic blank 11, which is filled with the polymer foam 16. As explained, this space can be of various thicknesses and can be appropriately used in the course of molding the inner layer from the acrylic tub, and this space can range, for example, between only a few millimeters and maximally approximately 50 mm, for example, wherein the space varies in the different areas of the tub 10. The relative thicknesses of the individual layers of the composite tub can be approximately seen in the enlarged detailed view in accordance with FIG. 3.

A further variation of a method in accordance with the invention will be described in what follows, making reference to FIGS. 4 to 6. An acrylic blank 11 is again shown in the lower area of FIG. 4, which has been placed on a core 12, wherein the future inside of the tub is downward oriented. Again, the core 12 rests on a base plate 9. Similar to the previously described method, an outer mold shell 13 is now first placed at a distance over the acrylic blank 11. This outer mold shell 13 is shown in the center in FIG. 4. After sealing, a suitable reaction resin is injected into the space between this outer mold shell 13 and the acrylic blank 11. Following curing of the reaction resin 15, the outer mold shell 13 is removed again, and an acrylic tub is obtained, whose underside is covered with a coating of reaction resin 15. This intermediate stage of the method of the invention is represented in FIG. 4a.

Another outer mold shell 18 is now placed on this, which has the dimensions of a tub support, which is a part of the finished tub 10, and which is represented at the top in FIG. 4. This outer mold shell 18 has a cube shape on the outside. The space now resulting between this outer mold shell 18 and the acrylic tub 11 covered with the coating is now filled with a polymer foam 19, which is injected between the tub and the outer mold shell 18. A finished tub 10 with an integrated tub support 20 is obtained after this polymer foam 19 has been cross-linked. This finished tub is represented in a sectional view in FIG. 5. Details result from the enlarged detailed representation in accordance with FIG. 6. As can be seen, with an arrangement of the tub in accordance with its purpose, this finished tub has an acrylic layer, made of the acrylic blank 11, on the inside and an adjoining coating layer made of the reaction resin 15 and an integrated tub support 20 connected with it. In this way a finished composite tub 10 is obtained, whose installation is made easier by means of the integrated tub support 20.

What is claimed is:

1. In a method for producing a composite tub having at least one steel tub and at least one acrylic tub firmly connected with each other, wherein in a first step a deep-drawn acrylic blank is inverted over a core, the improvement comprising:

positioning an outer mold shell (13) at a distance over the acrylic blank (1), then sealing the outer mold shell (13) and the acrylic blank (11) against each other and injecting a reaction resin into a first space formed between the outer mold shell (13) and the acrylic blank (11), after curing the reaction resin (15) removing the outer mold shell (13), then positioning a steel blank (14) on the cured reaction resin (15) and sealing the acrylic blank (11) and the steel blank (14) against each other, and then injecting a polymer foam (16) into a second space formed between the acrylic blank (11) and the steel blank (14) and after cross-linking unmolding the composite tub (10).

2. In the method in accordance with claim 1, wherein at least one of the reaction resin (15) and the polymer foam (16) is injected through one of a drain bore and an overflow bore (17) of the tub into a respective one of the first space and the second space.

3. In the method in accordance with claim 2, wherein the acrylic blank (11) is cut to one of a desired size and a desired shape after a deep-drawing procedure and before the acrylic blank (11) is inverted over the core (12).

4. In the method in accordance with claim 3, wherein the reaction resin (15) comprises a plastic material of one of methyl methacrylate, a polyurethane, an epoxy or a polyester.

5. In the method in accordance with claim 4, wherein a polyurethane foam system is used as the polymer foam (16).

6. In the method in accordance with claim 5, wherein one of a drain bore and an overflow bore is cut after the composite tub (10) is unmolded.

7. In the method in accordance with claim 1, wherein the acrylic blank (11) is cut to one of a desired size and a desired shape after a deep-drawing procedure and before the acrylic blank (11) is inverted over the core (12).

8. In the method in accordance with claim 1, wherein the reaction resin (15) comprises a plastic material of one of methyl methacrylate, a polyurethane, an epoxy and a polyester.

9. In the method in accordance with claim 1, wherein a polyurethane foam system is used as the polymer foam (16).

10. In the method in accordance with claim 1, wherein one of a drain bore and an overflow bore is cut after the composite tub (10) is unmolded.

11. In a method for producing a composite tub having at least one support and at least one acrylic shell firmly connected with each other, wherein in a first step a deep-drawn acrylic blank (11) is inverted over a core (12), the improvement comprising:

positioning a first outer mold shell (13) at a distance over the acrylic blank (11), sealing the first outer mold shell (13) and the acrylic blank (11) against each other, injecting a reaction resin into a first space between the first outer mold shell (13) and the acrylic blank (11), after curing the reaction resin (15), removing the first outer mold shell (13), and then positioning a second outer mold shell (18) having a dimension of a tub support, which is a part of the tub (10), on the cured reaction resin (15), and injecting a polymer foam (19) into a second space between the tub (10) and the second outer mold shell (18) to obtain a finished tub (10) with an integrated support (20) after the polymer foam (19) is cross-linked.

12. In the method in accordance with claim 1, wherein a seal is formed against the second mold shell (18).

13. In the method in accordance with claim 12, wherein one of a drain bore and an overflow bore (21) is cut into the finished tub.

14. In the method in accordance with claim 13, wherein a polyurethane foam system is used as the polymer foam (19).

15. In the method in accordance with claim 11, wherein one of a drain bore and an overflow bore (21) is cut into the finished tub.

16. In the method in accordance with claim 11, wherein a polyurethane foam system is used as the polymer foam (19).

* * * * *